United States Patent Office 3,198,530
Patented Aug. 3, 1965

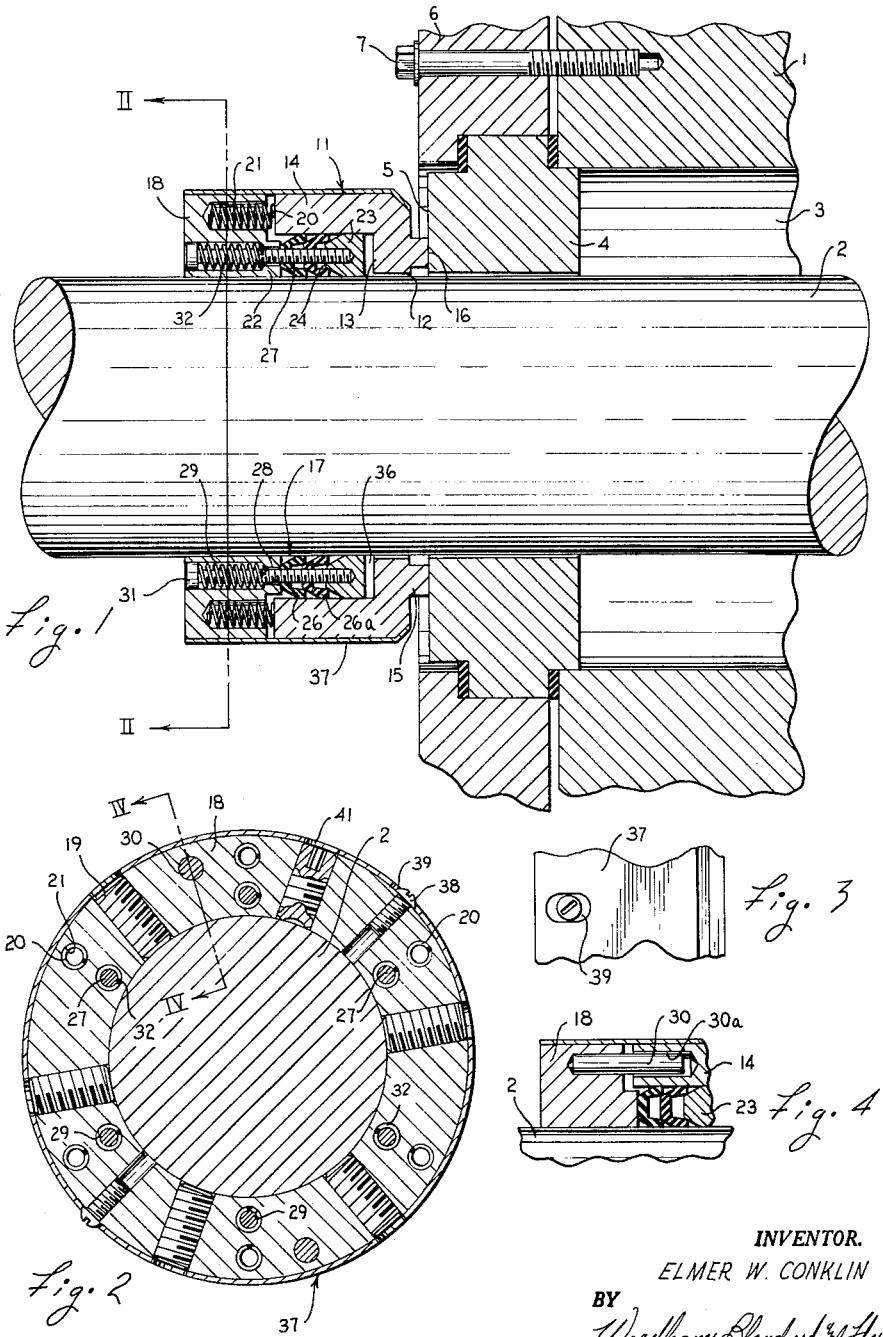

3,198,530
OUTSIDE BALANCED MECHANICAL SEAL
Elmer W. Conklin, Pavilion Township, Kalamazoo County, Mich., assignor to Durametallic Corporation, Kalamazoo, Mich., a corporation of Michigan
Filed Feb. 12, 1962, Ser. No. 172,650
1 Claim. (Cl. 277—85)

This invention relates to a mechanical seal for sealing a shaft with respect to an enclosure from which it extends, such as the stuffing box of a centrifugal pump. More particularly, this invention relates to a seal of the so-called "balanced" type wherein springs are utilized for creating a portion of the force urging the sealing faces together and for compressing the shaft packing and in which all springs are fully protected from contact with the fluid within the enclosure from which said shaft extends.

Mechanical shaft seals have been in wide commercial use for at least thirty years and have been constructed in a wide variety of designs. Throughout this period, one of the major problems with certain types of mechanical seals has been to protect the springs therein from corrosion by the fluid within the enclosure being sealed. This problem has been dealt with in a variety of ways but it has not previously, to my knowledge, been solved in a completely satisfactory fashion.

This problem is encountered in various types of equipment, such as pumps, autoclaves, mixers and various other fluid processing or handling equipment, wherein a rotating shaft extends through a wall. However, one common situation in which this problem is encountered is in the stuffing boxes of centrifugal pumps and, accordingly, for convenience in discussion hereinafter, the invention will be described in connection with such use. It will be clearly understood, however, that the selection of this particular use for disclosure purposes is solely for convenience in illustration and is not in any respect limiting.

Referring now, for illustrative purposes, as aforesaid, to the problem of providing a seal around the shaft of a centrifugal pump, a common type of mechanical seal utilizes a stationary, annular, sealing face affixed to the pump housing and a rotating, annular, sealing face affixed to the pump shaft. The two sealing faces are held in sealing engagement with each other and hence provide an effective seal against the passage of fluid from one side of the pump housing to the other along the shaft. Various types of resilient means, commonly metallic springs, are provided for initially urging and holding the sealing faces in sealing engagement with each other and, in many cases, for holding the shaft packing in sealing engagement with the shaft. Where the fluid either liquid or gaseous, being handled by the pump is corrosive the springs must be protected from contact with the fluid or else the seal will deteriorate rapidly. In low pressure applications, this has been accomplished by what is known in the trade as an "outside seal," that is, a seal within the rotating portion thereof, including the springs, is placed outside of the housing and the mutually contacting sealing faces. This arrangement effectively protects the springs from the fluid within the pump but thus far it has been limited to relatively low pumping pressures, such as 40 or 50 p.s.i. For higher pressure applications, it has been found essential to place the rotating portion of the seal in communication with the interior of the pump housing in order to utilize the pressure of the fluid being pumped to assist in urging the sealing faces together. This is effective for sealing against high pressures, but where the fluid being pumped is of corrosive nature, this construction exposes the rotating parts of the seal, including the springs to the corrosive effect of such fluid. This can usually be handled with respect to all parts of the rotating portion of the seal except the springs by selection of suitable corrosion-resistant materials. As to the springs, no materials have yet been found from which satisfactory springs can be made and which also can resist corrosion by some of the fluids with which the seals are required to be used.

Some attempts have been made to meet this problem by arranging flexible housings or jackets around the springs in the rotating portion of the seal but these have not been particularly satisfactory because either they have often leaked and hence failed to protect the springs anyway, or the material from which the flexible housing or jacket was made was itself subject to attack by the corrosive fluid.

Other attempts to meet this problem have involved the use of a so-called "double seal" wherein a pair of seals are arranged in a somewhat back-to-back relationship with respect to each other and are located at opposite ends of a stuffing box with the space between said seals being filled with a pressurized sealing fluid, such as oil. This has effectively protected the springs against attack by the fluid being pumped but it is expensive, introduces substantial operating and maintenance problems, often requires more space than is conveniently available and sometimes results in the sealing fluid leaking through the inside one of the pair of seals and contaminating the fluid being handled by the pump.

Further attempts to meet this problem have involved a type of seal which is basically an outside seal, in that the rotating portion of the seal is outside of the housing and the sealing faces, but wherein a portion of the fluid being pumped is permitted to pass axially along the shaft to a zone within the rotating portion of the seal itself so that the fluid exerts a pressure which assists in holding the sealing faces together in a manner generally similar to that accomplished in the above-mentioned inside seals. In such a seal, often called a "balanced" seal, the springs by which the sealing faces are initially urged together are outside of the equipment being sealed and, hence, partake of the above-mentioned advantages of an outside seal. However, since the fluid in this case is introduced into a zone within the rotating portion of the seal, this introduces the further problem of effecting a seal between said rotating portion and the shaft. This problem is seriously complicated by the fact that the rotating sealing member is necessarily free to float slightly on the shaft, both axially and angularly, in a manner to follow slight variations from exact perpendicularity of the sealing faces with respect to the axis of the shaft. Ordinary shaft packings between the rotating sealing member and the shaft, even though of a resilient nature, have not proven satisfactory. Some attempts have been made to use spring-backed shaft packings for this purpose but all such attempts, insofar as I am aware, have resulted in these springs being exposed to the fluid being handled by the pumps and, accordingly, subject to deterioration.

Accordingly, the objects of the invention include:

(1) To provide means for mechanically sealing a rotary shaft with respect to a wall through which it extends, which seal is of the outside balanced type and has spring-compressed shaft packing and wherein the springs are fully protected from contact with the fluid being handled by the equipment of which said shaft is a part.

(2) To provide a mechanical seal for equipment, as aforesaid, in which pressure fluid will be introduced into the interior of the rotating portion of the seal for pressure balancing purposes and in which the rotating sealing member will be permitted to float both axially and angularly with respect to the axis of the shaft but wherein said rotating sealing member will be effectively sealed with respect to the shaft.

(3) To provide a mechanical seal for equipment, as aforesaid, in which shaft packing is provided between the rotating sealing member and the shaft and is backed by resilient means, said resilient means being protected from contact by the fluid being handled by said equipment.

(4) To provide a mechanical seal for equipment, as aforesaid, which will be compatible with previously known designs for such seals and hence is adapted to a variety of uses.

(5) To provide a mechanical seal, as aforesaid, which will be effective with a wide variety of specific kinds and types of shaft packings.

(6) To provide a mechanical seal, as aforesaid, in which the resilient means by which said shaft packing is compressed into position, may be readily modified or interchanged to fit a variety of different operating purposes and circumstances.

Other objects and purposes of the invention will become apparent to persons acquainted with devices of this general type upon reading the following specification and inspecting the accompanying drawings.

In the drawings:

FIGURE 1 is a central longitudinal sectional view taken through a mechanical seal constructed according to the invention and shown in association with a shaft and a housing.

FIGURE 2 is a sectional view taken on the line II—II of FIGURE 1.

FIGURE 3 is a top plan view of a fragment of the structure shown in FIGURE 1.

FIGURE 4 is a sectional view taken on the line IV—IV of FIGURE 2.

*General description*

In general the invention comprises a mechanical seal of generally the "outside" type of construction, which seal has a zone at its radially inner side for receiving pressure fluid from within the equipment on which the seal is used. The pressure fluid supplies a balancing pressure on the axially outerside of the rotating sealing member which urges said rotating sealing member into sealing engagement with the nonrotating sealing member. Shaft packing is arranged between the rotating sealing member and the shaft on which it is mounted at a point axially outwardly of the afore-mentioned zone. A spreader ring of suitably corrosive-resistant material is arranged between the aforementioned zone and the shaft packing. Rods are anchored in the spreader ring and extend through the shaft packing away from the zone. The rods are engaged by resilient means on the side of the shaft packing opposite the zone and suitable tension is applied thereto for pulling the spreader ring against the shaft packing and holding said shaft packing under suitable pressure so that it sealingly engages the shaft and the rotating sealing member. The resilient means, which may be coil springs surrounding the rods, are thereby protected from contact with the fluid but insure effective operation of the shaft packing.

*Detailed description*

In the following description certain terminology will be used for convenience in reference but it will be understood that such terminology is employed solely for convenience in description and has no limiting effect. The terms "inside" and "outside" and derivatives thereof will refer to directions axially of said shaft toward and away from the interior of the equipment with which said shaft is used. The terms "toward" and "away" also will refer to directions axially of said shaft toward and away from the interior of the equipment with which the shaft is used. The terms "radially inwardly" and "radially outwardly" will refer to directions toward and away from the axis of the shaft.

Referring now particularly to FIGURE 1, there is indicated a housing 1 which will be understood to refer to the housing of the pump, mixer, autoclave or other equipment with which the seal is being used. A shaft 2 extends through an opening 3 within said housing, said shaft being supported for rotation with respect to the housing by an appropriate bearing means (not shown). A nonrotating seal member 4, commonly called an "insert" in the trade, encircles said shaft and is arranged within a suitable mounting ring 6. The ring 6 also encircles said shaft and is fastened to the housing 1 by any convenient means, such as screws, one of which is indicated at 7. While the insert can be made of a variety of materials, as is well known to those skilled in the art, frequently it is made of a ceramic of various types and hardnesses depending on particular use requirements. The insert 4 has a planar axially outwardly facing surface 5 which functions as a stationary sealing face. The mounting ring 6 is made from a metal or alloy suitable physically and chemically for the ambient conditions.

A rotating sealing member 11 encircles the shaft and has a radially extending body portion 13 whose radially inner end is spaced slightly from said shaft to provide a passageway 12 therebetween. The sealing member 11 also has a sleeve portion 14 which extends axially away from the insert 4 and which surrounds and is spaced a substantial radial distance from the shaft 2. The member 11 also has an axially projecting annular flange 15 whose end surface 16 engages the surface 5 of the insert 4 and thus functions as the rotatable sealing face of the mechanical seal. The internal wall of the sleeve 14 defines an annular chamber 17 around the shaft 2.

A collar 18 is affixed to the shaft 2 by any convenient means, such as by set screws 19. A plurality of springs 20 are mounted in circumferentially spaced recesses 21 in the collar 18 and extend axially therefrom and engage the outer axial end of sleeve 14. The springs 20 urge the rotating sealing member 11 inwardly (rightwardly) so that surface 16 sealingly engages surface 5 to thereby prevent escape therebetween of fluid from within the housing 1.

The collar 18 has an annular boss 22 which projects a small axial distance into the chamber 17. A spreader ring 23 having, in the present case where it is used with packing of substantially V-shape in cross section, a tapered portion 24 is disposed in the chamber 17 encircling the shaft 2 and said ring is spaced axially from boss 22. A plurality, here two, of substantially V-shaped, annular packing elements 26 and 26a are disposed in the chamber 17 and encircle the shaft 2 between the boss 22 and the spreader ring 23. The tapered portion 24 fits between the lips of the adjacent packing element 26a and the tapered central portion of said element 26a fits between the lips of the other element 26. Thus, when spreader ring 23 is urged toward boss 22, the lips of the packing elements 26 and 26a are spread apart into sealing engagement with the shaft 2 and the internal wall of sleeve 14.

A plurality of circumferentially spaced rods 27 are mounted, hereby being threaded thereinto, on ring 23 and extend axially outwardly therefrom through openings in said packing elements 26 and 26a. The rods 27 slidably extend through openings 28 in the collar 18, thence into spring-receiving recesses 29 in said collar, which recesses open through the outer axial face of said collar. The rods 27 have enlarged heads 31 on their outer axial ends. A spring 32 encircles each rod 27 and seats at one of its ends against the head 31 and seats at its other end against the inner end wall of recess 29. The springs 32 are under compression so that the rods 27 and thereby the ring 23 are continuously urged axially outwardly with respect to the housing 1 to thereby continuously urge the lips of the packing elements 26 and 26a apart and thereby into sealing engagement with the shaft 2 and the internal wall of sleeve 14, as above described.

The space between the spreader ring 23 and the body portion 13 defines a pressure zone 36 which continuously communicates through passageway 12 with the interior of housing 1. Thus, the pressure fluid in said housing can travel to zone 36 and act therein to urge the sealing member 11 inwardly to cause surface 16 to sealingly engage with surface 5. Such pressure also urges the spreader ring 23 axially outwardly to maintain the packing elements in sealing engagement with the shaft 2 and the internal wall of sleeve 14 as above described. Of course, such pressure fluid is not available when the mechanism in housing 1 is being started up so that the springs 20 and 32 hold the parts in sealing engagement during such starting time and co-operate with the fluid pressure when it is available to maintain such seal.

If desired, a shroud 37 may encircle the collar 18 and the sealing member 11. The shroud 37 is secured to collar 18 by screws 38, said screws extending through axially elongated openings 39 (FIGURE 3) in the shroud so that the shroud 37 and the collar may move axially with respect to each other a limited distance. The shroud 37 also has openings 41 whereby the set screws 19 may be manipulated. This arrangement holds the collar 18 and sealing member 11 in association with each other so that they can be mounted on the shaft 2 as a unit. However, it permits relative axial movement of the collar 18 and the sealing member 11 as necessary to establish the proper sealing relationship between surfaces 5 and 16.

While in some uses, especially those involving smaller sizes, the rotating member 11 will be sufficiently driven by the frictional engagement therewith of the shroud 37, in the more usual applications the rotating member 11 is driven from the collar 18 by conventional drive pins 30. These drive pins, here two, are in this embodiment press fitted into the collar and are slidably received into openings 30a in the rotating member 11.

Since the spreader ring 23 urges both the radially inner and radially outer surfaces of the packing elements 26 and 26a snugly against the radially inner and outer surfaces of the chamber 17, the packing elements will effectively prevent the passage of pressure fluid from within the pressure zone 36 outwardly into the region occupied by the springs 20 and 32 and the springs are accordingly protected from corrosion.

The remainder of the seal operates in a normal manner but same will be mentioned briefly to ensure a complete understanding of the invention. Rotation of the shaft 2 acts through the collar 18 and the drive pins 30 (or the shroud 37 if no drive pins are used) to rotate the sealing member 11. The springs 20 effect an initial engagement between the rotating sealing member 11 and the nonrotating sealing member 4 while the pressure builds up within the housing 1. When such pressure does become available, the pressure fluid enters through the passageway 12 into the pressure zone 36 and acts against the sealing member 11 to urge same in an axially inward direction and thereby hold same snugly against the nonrotating sealing member. This effect continues as the pressure builds up within the said housing and will in a well-known manner maintain the nonrotating and the rotating sealing faces snugly together in sealing relationship with each other. Pressure as high as 400 p.s.i. have been successfully sealed by seals made according to the invention.

While V-shaped packing has been specifically shown herein, and such as preferable for the purposes of the present invention, it will be understood that other forms of packing, such as packing of circular cross section, which will spread radially inwardly and outwardly upon application of axial pressure thereto, will also be acceptable.

The sealing member 11, the ring 23 and the packing elements 26 and 26a, which are the only parts of the mechanical seal which contact the pressure fluid, can be made of any material desired by those skilled in the art, particularly a suitable chemically inert material so that corrosion thereof is not possible. For example, the sealing member 11 is usually made of a carbon of any desired type and hardness and the ring 23 and packing elements 26 and 26a are frequently made essentially of a tetrafluoroethylene resin.

While a particular preferred embodiment of the invention has been disclosed in detail hereinabove, it will be recognized that the invention includes such variations thereof as lie within the scope of the invention as defined in the appended claim.

What is claimed is:

In a mechanical seal for sealing a rotating shaft with respect to a housing through which said shaft extends, wherein a first nonmetallic sealing member is affixed to said housing, a second nonmetallic sealing member encircles said shaft and is radially spaced therefrom, said second sealing member having a sealing surface engageable with a sealing surface on said first sealing member, said second sealing member having a sleeve extending away from said first sealing member and surrounding said shaft to define a pressure chamber between said sleeve and said shaft for reception of a balancing pressure fluid from within said housing, and driving means affixed to said shaft for effecting rotation of said second sealing member with said shaft, the improvement comprising:

means providing a wall extending from said sleeve into close proximity to said shaft;
substantially V-shaped shaft packing means within said pressure chamber spaced axially from said wall and adapted to engage sealingly said shaft and said sleeve, said shaft packing means being of such characteristics that an axial pressure thereon will cause same to spread radially inwardly and outwardly;
said driving means including a collar affixed to said shaft, said collar having elongated spring-receiving recesses in the end thereof remote from said chamber and passages of smaller cross-sectional size than said recesses and extending from said recesses to said chamber;
a nonmetallic compression ring bearing against the axial side of said shaft packing means nearest said wall, said compression ring having a tapered central portion entering between the legs of said packing means for urging said legs apart;
a plurality of circumferentially spaced rods anchored to said compression ring and extending axially through said shaft packing means and through said passages into said recesses, said rods having enlarged heads, a coil spring disposed within each of said recesses surrounding said rod therein and bearing at one end against said rod head and bearing at the other end against the bottom of said recess for urging said compression ring against said shaft packing means and thereby urging said shaft packing means against said sleeve and said shaft whereby to seal the end of said pressure chamber remote from said wall and thereby prevent escape of pressure fluid therefrom while preventing contact of said springs by said pressure fluid.

References Cited by the Examiner

UNITED STATES PATENTS 2,434,458  1/48  Curry _____ 277—91
3,129,949  4/64  Laux _____ 277—27

FOREIGN PATENTS 519,439  5/53  Belgium.
831,784  6/38  France.
714,377  11/41  Germany.

LEWIS J. LENNY, *Primary Examiner.*

WALTER A. SCHEEL, EDWARD V. BENHAM,
*Examiners.*